(12) United States Patent
Zhang

(10) Patent No.: US 11,885,441 B1
(45) Date of Patent: Jan. 30, 2024

(54) TELESCOPIC DRAINPIPE ASSEMBLY

(71) Applicant: Xi Zhang, Guangdong (CN)

(72) Inventor: Xi Zhang, Guangdong (CN)

(73) Assignee: Shenzhen Ruichenxi Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/088,722

(22) Filed: Dec. 26, 2022

(30) Foreign Application Priority Data

Dec. 12, 2022 (CN) .......................... 202223355007.4

(51) Int. Cl.
*F16L 11/00* (2006.01)
*F16L 11/11* (2006.01)

(52) U.S. Cl.
CPC ..................................... *F16L 11/11* (2013.01)

(58) Field of Classification Search
CPC ........................................................ F16L 11/11
USPC .................................. 138/109, 120, 121, 122
See application file for complete search history.

(56) References Cited

U.S. PATENT DOCUMENTS

| | | | | |
|---|---|---|---|---|
| 3,493,251 A | * | 2/1970 | Kramer .................. | F16L 33/24 285/260 |
| 3,695,643 A | * | 10/1972 | Schmunk ................ | F16L 47/32 285/903 |
| 3,743,328 A | * | 7/1973 | Longfellow ............ | F16L 33/26 285/903 |
| 3,899,198 A | * | 8/1975 | Maroschak ........... | F16L 37/084 285/133.11 |
| 3,942,915 A | | 3/1976 | Thomas | |
| 4,140,422 A | * | 2/1979 | Crumpler, Jr. ......... | F16L 37/248 285/401 |
| 4,557,510 A | * | 12/1985 | Overmyer ........... | F16L 25/0036 138/158 |
| 4,909,547 A | * | 3/1990 | Guy .................... | F16L 25/0036 285/903 |
| 5,257,836 A | * | 11/1993 | Smith .................... | F16L 21/03 285/392 |
| 5,478,123 A | * | 12/1995 | Kanao .................... | F16L 47/02 285/291.1 |
| 5,765,880 A | * | 6/1998 | Goddard ............. | F16L 25/0063 285/903 |
| 5,842,727 A | * | 12/1998 | Shade ................. | F16L 25/0036 285/903 |
| 5,904,183 A | * | 5/1999 | Leech .................... | B60R 15/00 137/355.16 |
| 7,677,271 B2 | | 3/2010 | Boettner et al. | |
| 8,051,879 B2 | | 11/2011 | Zeyfang | |
| (Continued) | | | | |

*Primary Examiner* — James F Hook

(57) ABSTRACT

The present invention relates to a telescopic drainpipe assembly, which includes a spiral telescopic pipe body and a first adapter connected to one end of the spiral telescopic pipe body. The first adapter includes a hollow first adapter seat and a first pipe connector connected to the first adapter seat, the first pipe connector is spirally provided, and the first pipe connector is in threaded connection to the spiral telescopic pipe body. The telescopic drainpipe assembly is capable of increasing the drainage length as required, or shortening the length as required for storage. Moreover, the first adapter is capable of being installed to the spiral telescopic pipe body through threaded connection. The structure is reasonable, easy to disassemble and assemble, convenient for replacing the spiral telescopic pipe body as needed, and the first adapter can be reused, thereby effectively saving usage, costs.

12 Claims, 6 Drawing Sheets

(56) References Cited

U.S. PATENT DOCUMENTS

| | | | |
|---|---|---|---|
| 9,027,603 B2 | 5/2015 | Zeyfang et al. | |
| 9,310,000 B2 | 4/2016 | Liang | |
| 2007/0243031 A1* | 10/2007 | Yun | B23B 47/00 408/67 |
| 2010/0282351 A1 | 11/2010 | Kamiyama et al. | |
| 2014/0130929 A1* | 5/2014 | Elliott | F16L 11/111 138/121 |
| 2015/0136267 A1 | 5/2015 | Yu | |

\* cited by examiner

TELESCOPIC DRAINPIPE ASSEMBLY

TECHNICAL FIELD

The present invention relates to the technical field of drain technology, and in particular, to a telescopic drainpipe assembly.

BACKGROUND

At present, flexible water pipes in the market are usually those integrally formed with a telescopic pipe body and an adapter by blow molding. During the production, new different injection molds need to be built with telescopic bodies with different lengths and drainpipes with different orifice sizes, and the production cost of an integral water pipe together with an adapter by multiple blow molding is relatively high. Besides during the usage of the water pipe, part of a telescopic pipe body, an adapter seat, itself, and a connection part between an adapter and the telescopic pipe body are easily damaged, individually. In addition, since the telescopic drainpipe is usually fixedly connected with the adapter seat, when the water pipe is damaged, the telescopic pipe body and the adapter will be scrapped together, which greatly increases the usage costs. This structure brings many inconveniences to both users and manufacturers, such as high costs and unfavorable recycling.

SUMMARY

On such basis, in response to the problems of existing flexible water pipes, it is necessary to provide a telescopic drainpipe assembly for use under the eaves of a roof in which a pipe body and an adapter can be produced separately and easily disassembled for easy replacement and maintenance, while saving production costs and usage costs.

A telescopic drainpipe assembly, including: a spiral telescopic pipe body, a first adapter connected to one end of the spiral telescopic pipe body; where the first adapter comprises a hollow first adapter seat and a first pipe connector connected to the first adapter seat, the first pipe connector is spirally provided, and the first pipe connector is in threaded connection to the spiral telescopic pipe body.

Since the telescopic drainpipe assembly above is a spiral telescopic pipe body, the length thereof may be adjusted as required during usage. The length of the spiral telescopic pipe body can be extended when the drainage length is not enough; and the spiral telescopic pipe body can be compressed for storage when the drainage length is too long to use, where the pipe is convenient for storage. Moreover, a mold of the adapter can only be blown separately during blow molding, and the first pipe connector of the first adapter is spirally provided, where the first adapter is capable of being installed to the spiral telescopic pipe body through threaded connection. The structure is reasonable, easy to disassemble and assemble, convenient for replacing the spiral telescopic pipe body as needed, and the first adapter can be reused, effectively saving production costs and usage costs.

In one embodiment, the first adapter seat is provided with at least two first clamping grooves, and the first clamping groove is located on an outer wall of the first adapter seat.

In one embodiment, the first adapter seat is provided with at least one first leak-proof gasket, and the first leak-proof gasket is arranged around an outer wall of the first adapter seat.

In one embodiment, the first leak-proof gasket is arranged at one end of the first adapter seat away from the first pipe connector.

In one embodiment, the first adapter seat is provided with a locking adapter, and the locking adapter is located on the outer wall of the first adapter seat.

In one embodiment, the first adapter seat includes a first rectangular section and a first horn section which are interconnected, and the first horn section is connected with the first pipe connector.

In one embodiment, the first pipe connector is made of a telescopic material.

In one embodiment, a second adapter connected to one end of the spiral telescopic pipe body is further included; where the first adapter includes a hollow first adapter seat and a first pipe connector connected to the first adapter seat, the first pipe connector is spirally provided, and the first pipe connector is in threaded connection to the spiral telescopic pipe body.

In one embodiment, the second adapter seat is provided with at least two second clamping, grooves, and the second clamping groove is located on an, outer wall of the second adapter seat.

In one embodiment, the second adapter seat is provided with at least one second leak-proof gasket, and the second leak-proof gasket is arranged around the outer wall of the second adapter seat.

In one embodiment, the second adapter seat includes a second rectangular section and a second horn section which are interconnected, and the second horn section is connected with the second pipe connector.

In one embodiment, the second pipe connector is made of a telescopic material.

BRIEF DESCRIPTION OF THE DRAWINGS

The drawings of the specification that form a part of the present application, are used to provide a further understanding of present the invention. Schematic embodiments and their descriptions of the present invention are used to explain the invention and do not constitute an improper limitation of the present invention. In the drawings.

DETAILED DESCRIPTION OF THE EMBODIMENTS

Figure 1:
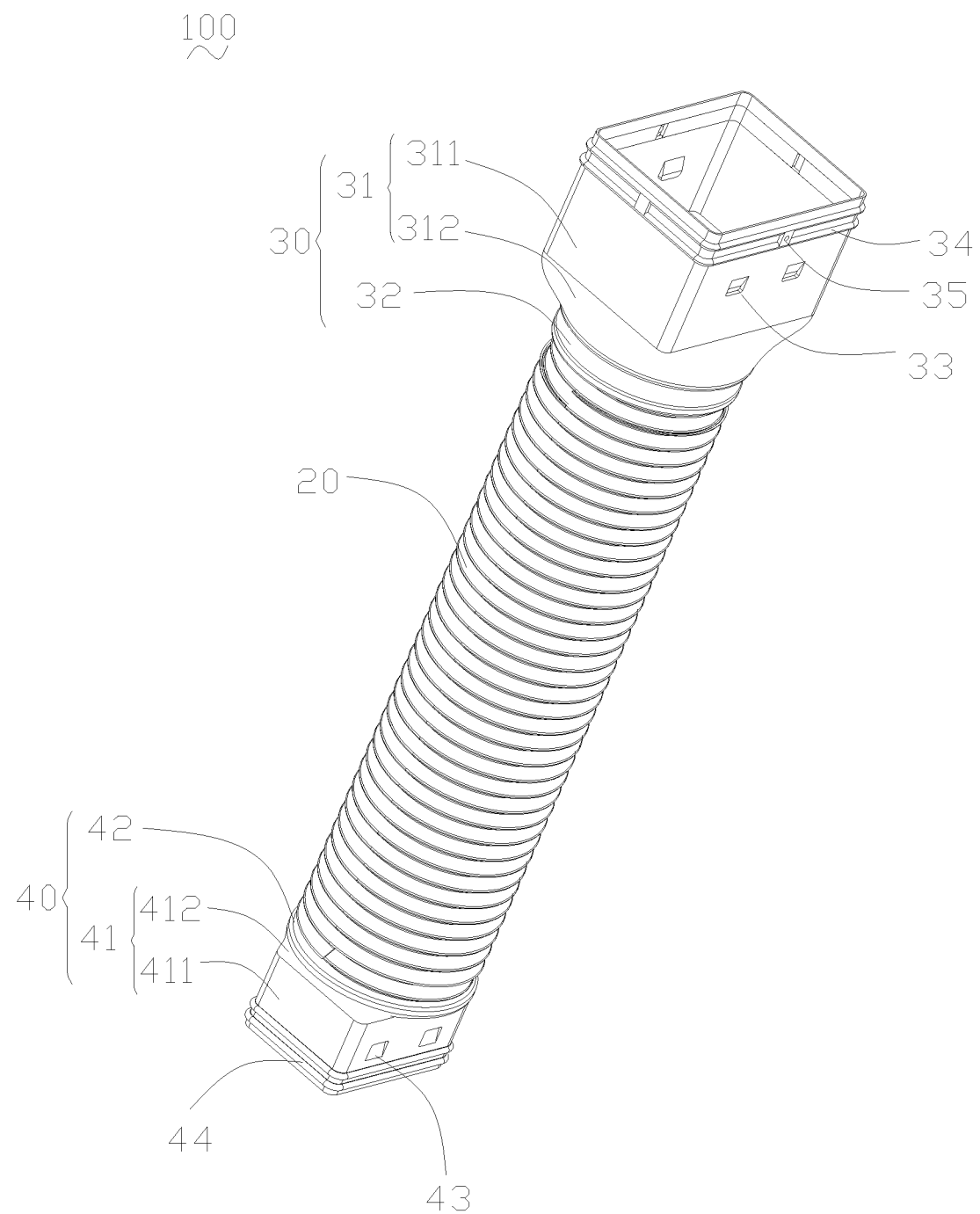
FIG. 1 shows a schematic diagram of a telescopic drainpipe assembly of the present invention.

The present invention will be described in detail below with reference to the drawings and in combination with embodiments. Various examples are provided by way of interpretation of the present invention rather than limiting the present invention. In fact, those skilled in the art will know that modifications and variations can be made to the present invention without departing from the scope or spirit of the present invention. For example, features shown or described as part of one embodiment may be used in another embodiment to generate another embodiment. It is therefore desirable that the present invention, includes such modifications and variations that fall within the scope of the appended claims and their equivalents.

In the description of the present invention, the terms "longitudinal", "latitudinal", "up", "down", "front". "rear", "left", "right", "vertical", "horizontal", "top", "bottom", etc. indicate the orientation or positional relationship based on the drawings, which is only for the convenience of describing the present invention rather than requiring the present invention to be constructed and operated in a specific orientation, Therefore, it cannot be understood as a limitation of the present invention. The terms "connected", "connection" and "configure" used in the present invention should be understood in a broad sense, for example, it can be a fixed connection or a detachable connection; it can be a direct connection or an indirect connection through an intermediate part; it can be a wired electrical connection, a radio connection, or a wireless communication signal connection. For those skilled in the art, the specific meaning of the above terms can be understood according to the specific situation.

One or more examples of the present invention are shown in the drawings. The detailed description uses numerals and letter markers to refer to features in the drawings. Similar or like numerals in the drawings and descriptions have been used to refer to similar or like parts of the present invention. As used herein, the terms "first", "second", and "third" are used interchangeably to distinguish one component from another and are not intended to indicate the location or importance of individual components.

Figure 2:
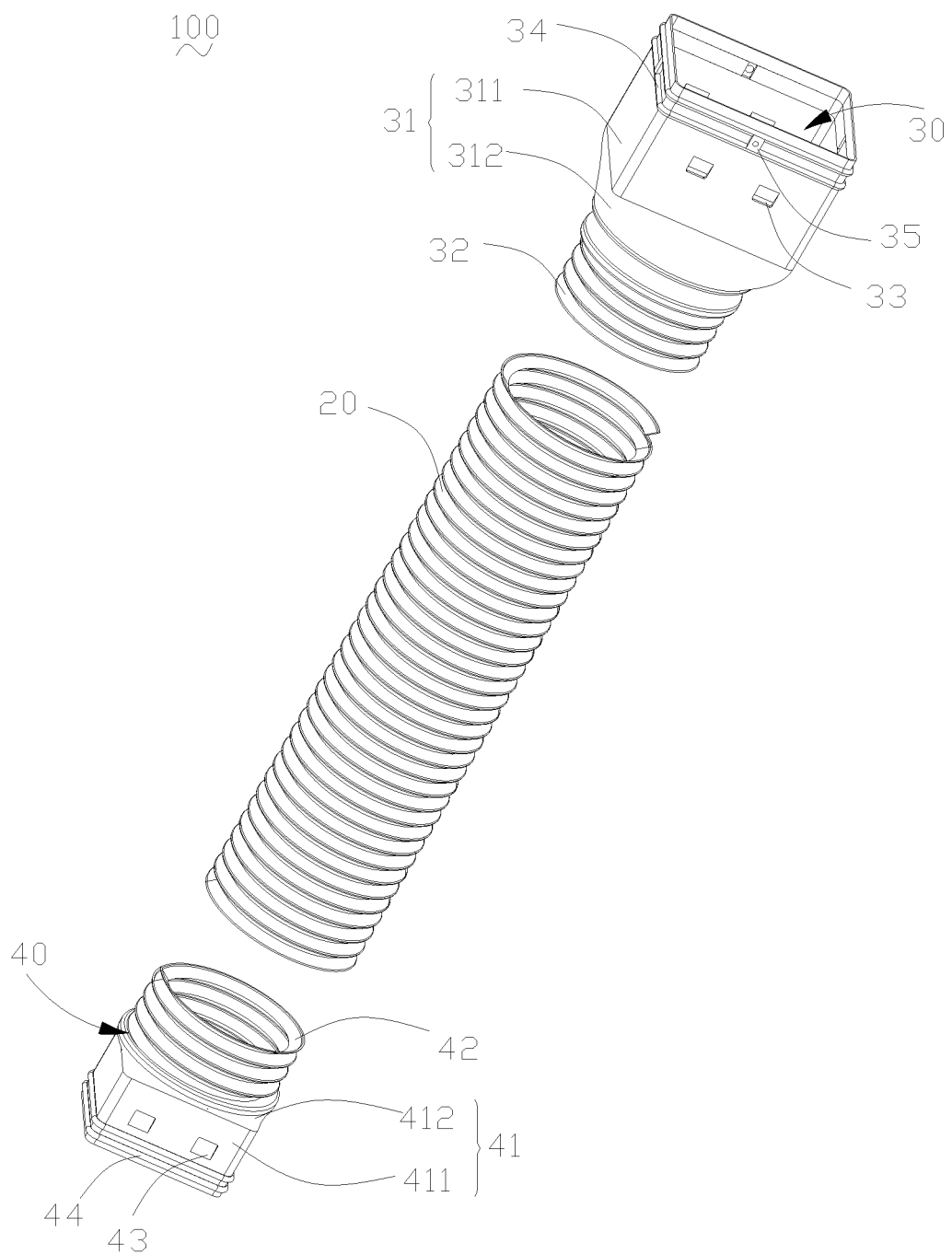
FIG. 2 shows a schematic diagram of the telescopic drainpipe assembly shown in FIG. 1 in an elongated separated state.
Figure 3:
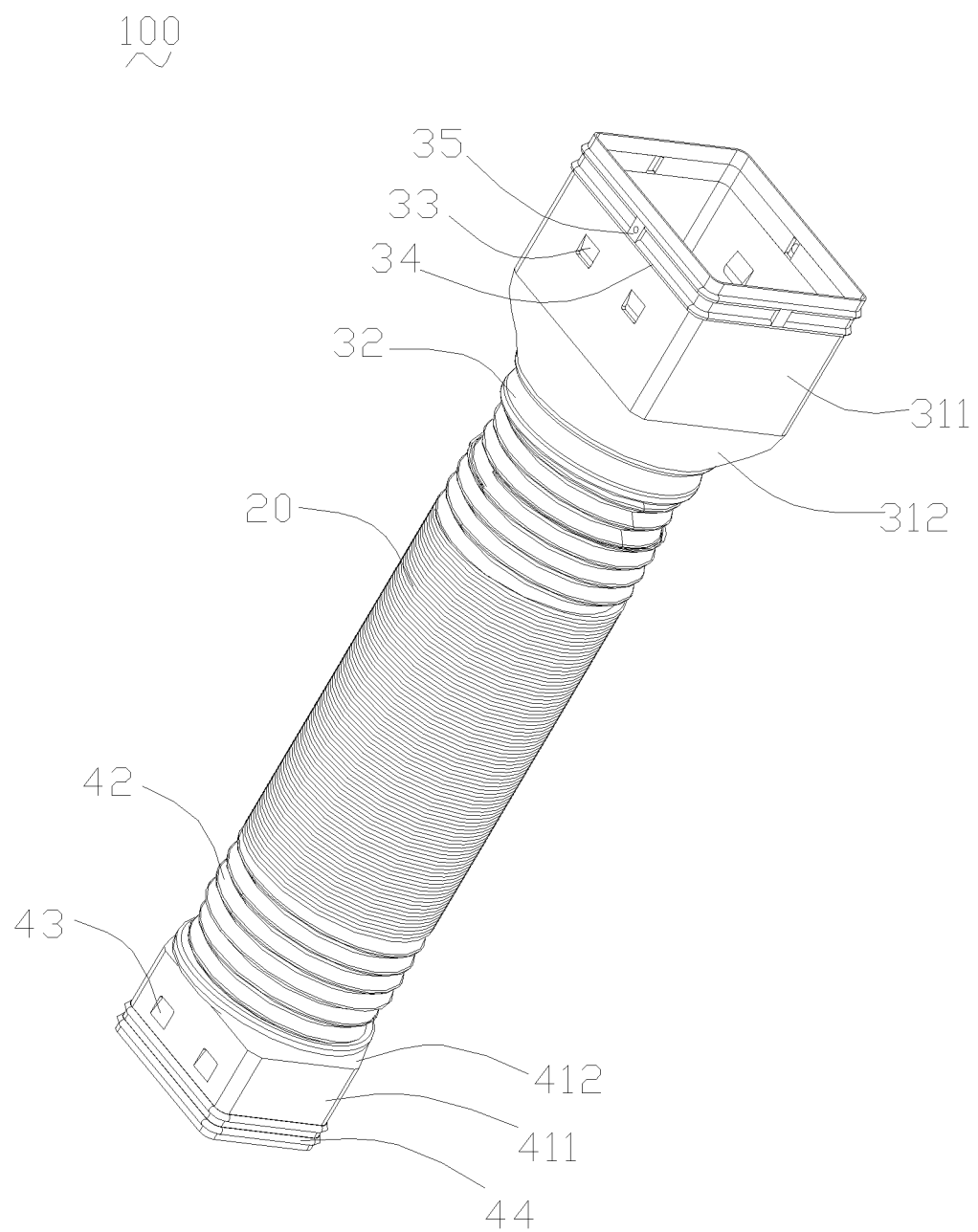
FIG. 3 shows a schematic diagram of the telescopic drainpipe assembly shown in FIG. 1 in a contracted state.
Figure 4:
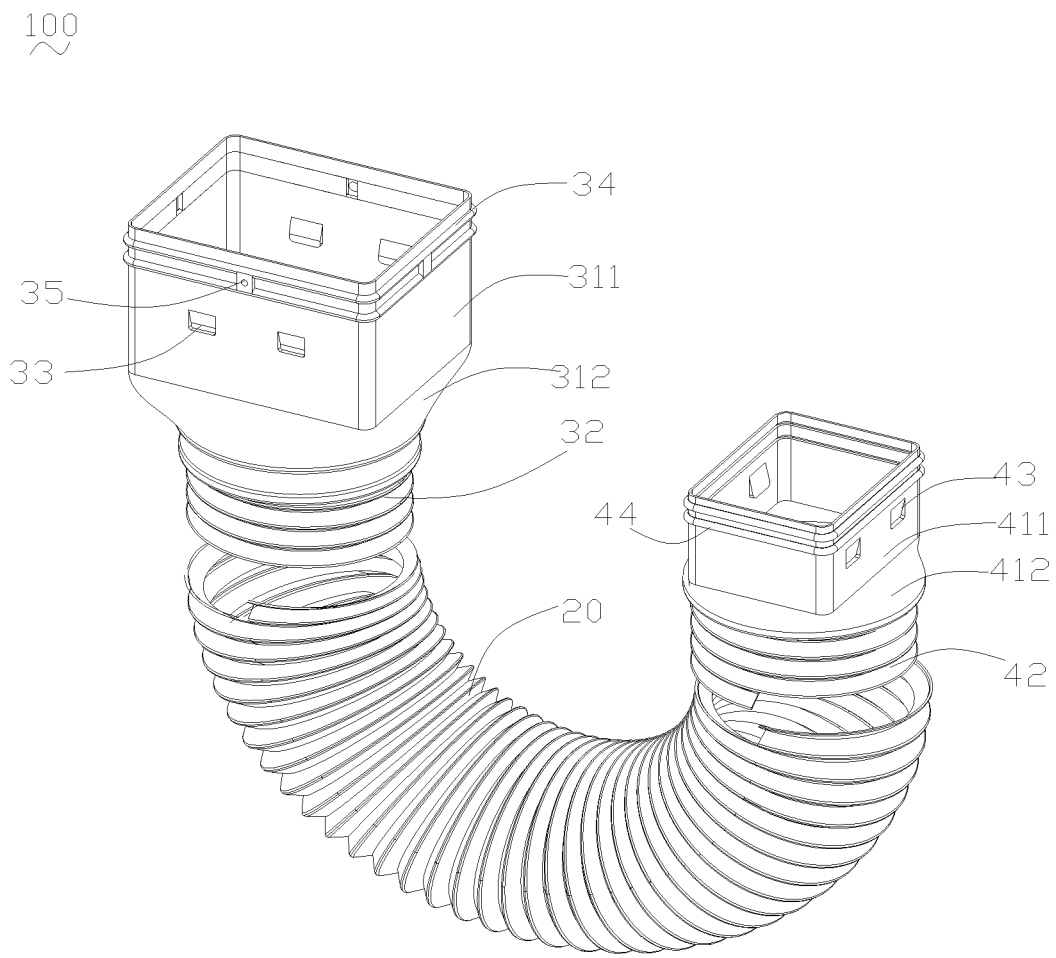
FIG. 4 shows a schematic diagram of the telescopic drainpipe assembly shown in FIG. 1 in a bent separated state.
Figure 5:
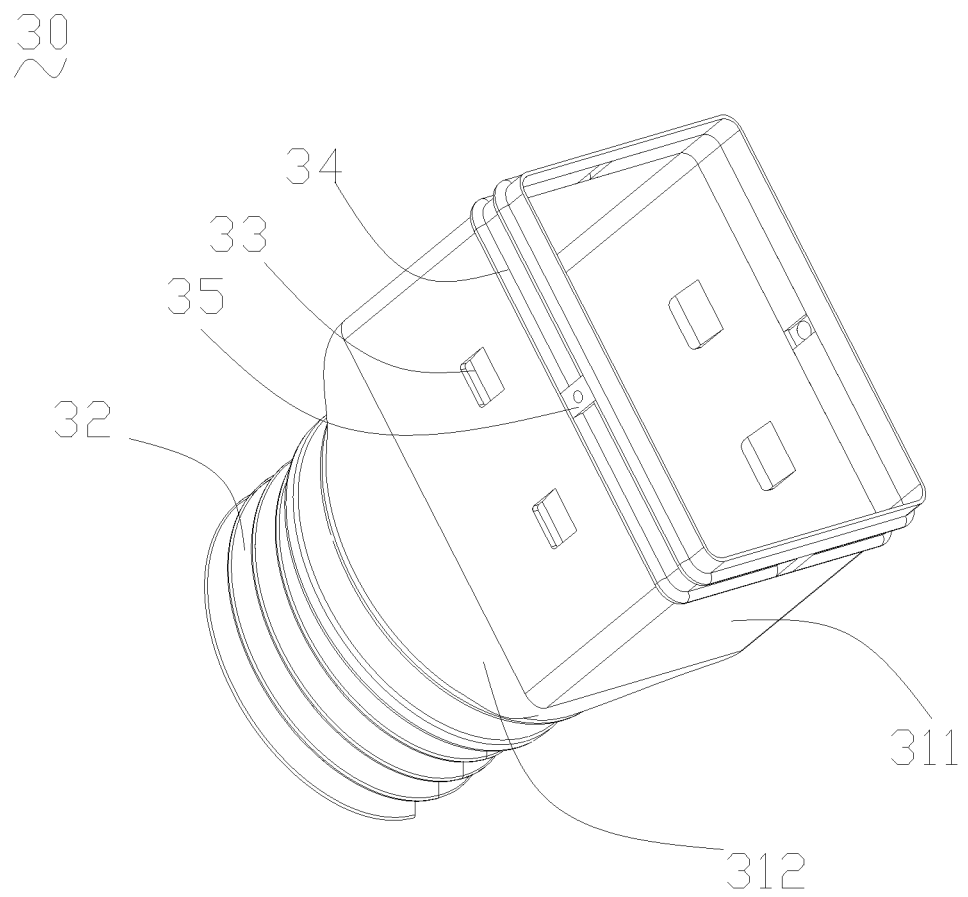
FIG. 5 shows a schematic diagram of a first adapter of the telescopic drainpipe assembly shown in FIG. 1.
Figure 6:
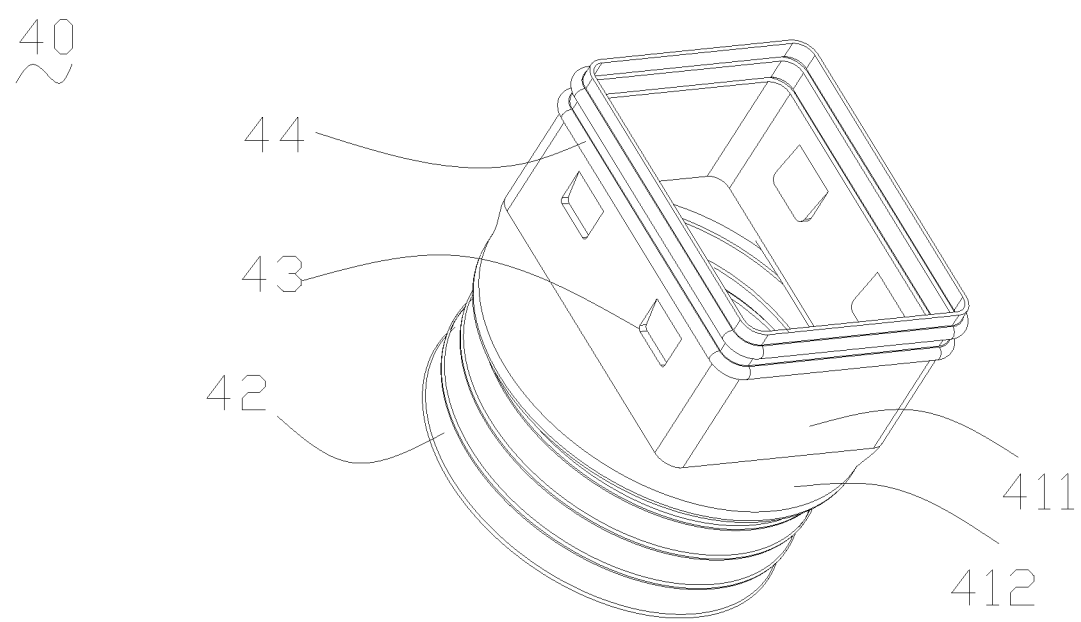
FIG. 6 shows a schematic diagram of a second adapter of the telescopic drainpipe assembly shown in FIG. 1.

According to an embodiment of the present invention, please refer to FIGS. 1 to 6 for schematic diagrams of the telescopic drainpipe assembly 100 of the present invention in different states, including schematic diagrams of an elongated connected state, an elongated separated state, a contracted state, and a bent separated state. The telescopic drainpipe assembly 100 includes a spiral telescopic pipe body 20, a first adapter 30 connected to one end of the spiral telescopic pipe body 20, where the spiral telescopic pipe body 20 is made of a material with a certain degree of elasticity, and the first adapter 30 is connected to an external drain when in use. The spiral telescopic pipe body 20 can be produced, with a corresponding length and size according to actual needs, with adaptability and flexibility.

Further, the first adapter 30 includes a hollow first adapter seat 31 sand a first pipe connector 32 connected to the first adapter seat 31, the first pipe connector 32 is spirally provided, and the first pipe connector 32 is in threaded connection to the spiral telescopic pipe body 20. Since the telescopic drainpipe assembly 100 above is a spiral telescopic pipe body 20, the length thereof may be adjusted as required during usage. The length of the spiral telescopic pipe body 20 can be extended when the drainage length is not enough; and the spiral telescopic pipe body 20 can be compressed for storage when the drainage length is too long to use, where the pipe is convenient for storage. The first pipe connector 32 of the first adapter 30 is spirally provided, where the first adapter 30 is capable of being installed in threaded connection to the spiral telescopic pipe body 20 through the first pipe connector 32. The structure is reasonable, easy to disassemble and assemble, convenient for replacing the spiral telescopic pipe body 20 as needed, and the first adapter 30 can be reused, effectively saving production costs and usage costs. The installation between the first pipe connector 32 and the spiral telescopic pipe body 20 can be realized by screwing in a threaded structure, while the disassembly can be realized by screwing out the threaded structure along a threaded path. The installation and disassembly are efficient and convenient, without the need of using glue to strengthen the fixation (which cannot be disassembled) and an intermediate structure with threads between the adapter and the telescopic pipe body, so as to reduce the cost and simplify the structure.

Further, the first pipe connector 32 is made of a hard material and cannot be retracted, so the spiral telescopic pipe body 20 can be firmly installed on the first pipe connector 32. The first pipe connector 32 plays a good installation and supporting role, so the spiral telescopic pipe body 20 is not easy to loosen from the first pipe connector 32 along the axis. In order to further facilitate the storage, the first pipe connector 32 is made of a telescopic material, so that the first pipe connector 32 of the first adapter 30 can also be contracted to a certain extent to reduce the occupied space and facilitate the storage. In the present embodiment, the size of the first pipe connector 32 is slightly smaller than that of the spiral telescopic pipe body 20. When assembling, the outer wall of the first pipe connector 32 is abutted with the inner wall of the spiral telescopic pipe body 20. It can be expected that in other embodiments, the size of the first pipe connector 32 is slightly larger than that of the spiral telescopic pipe body 20. When assembling, the inner wall of the first pipe connector 32 is butted with the outer wall of the spiral telescopic pipe body 20.

Further, the first adapter seat 31 is provided with at least two first clamping grooves 33, and the first clamping groove 33 is located on an outer wall of the first adapter seat 31 so that the drainpipe of a house can be clamped and installed by means of the first clamping groove 33. A plurality of first clamping grooves 33 are symmetrically arranged on the first adapter seat 31, which can ensure that the first clamping groove 33 won't fall off along the axial direction of the drainpipe after installation.

Further, the first adapter seat 31 is provided with at least one first leak-proof gasket 34, and the first, leak-proof gasket 34 is provided around the outer wall of the first adapter seat 31 so that the first adapter seat 31 will abut against an inner wall of the drainpipe after being clamped and installed to the drainpipe of the house to provide a leak-proof sealing. The first leak-proof gasket 34 is located at one end of the first adapter seat 31 away from the first pipe connector 32. In the present embodiment, two first leak-proof gaskets 34 are provided, so that a double sealing may be formed, delivering a better leak-proof sealing effect.

Further, the first adapter seat 31 is provided with a locking adapter 35, and the locking adapter 35 is located on the outer wall of the first adapter seat, so that the adapter seat 31 can be locked with the drainpipe of the house by screws during installation, which further ensures the stability of installation and connection. In the present embodiment, two locking adapters 35 are provided, symmetrically arranged on the first adapter seat 31, so that the locking force is evenly distributed and the layout is reasonable.

Further, the first adapter seat 31 includes a first rectangular section 311 and a first horn section 312 which are interconnected, and the first horn section 312 is connected with the first pipe connector 32, where the first rectangular section 311 can prevent the drainpipe of the house from rotating loose along the circumference of the drainpipe after installation. And the drainage space of the first rectangular section 311 is larger than that of the first horn section 312, so the first rectangular section 311 increases the drainage area and facilitates the inflow of water from the drainpipe of the house, and the first horn section 312 plays the role of guidance and diversion, which facilitates the entry of water into the spiral telescopic pipe body 20. In the present embodiment, there are four first clamping grooves 33, in a group of two first clamping grooves 33, and the two groups of first clamping grooves 33 are located on outer walls of two opposite sides of the first rectangular section 311. In other embodiments, the first adapter seat 31 may also be other hollow shapes, such as circular tubular shape, pentagonal tubular shape, etc., which is not limited herein.

In another embodiment, the telescopic drainpipe assembly 100 further includes a second adapter 40 connected to the other end of the spiral telescopic pipe body 20, and through the arrangement of the second adapter 40, both the front end and the rear end of the whole telescopic drainpipe assembly 100 can be connected to the drainpipe. The sizes of the second adapter 40 and the first adapter 30 can be the same or different and can be determined according to the size of the connected drainpipe, and the specific sizes thereof are not limited herein. In the present embodiment, the size of the first adapter 30 is greater than that of the second adapter 40.

Further, the second adapter 40 includes a hollow second adapter seat 41 and a second pipe connector 42 connected to the second adapter seat 41, the second pipe connector 42 is spirally provided, and the second pipe connector 42 is in threaded connection to the spiral telescopic pipe body 20. The second adapter 40 is provided with the second pipe connector 42 of a spiral telescopic structure so that the structure is reasonable, and the disassembly and assembly between the spiral telescopic pipe bodies 20 is convenient and quick, and it is convenient for replacing the spiral telescopic pipe body 20 as needed, and the second adapter 40 can be reused, effectively saving usage costs.

Further, the second pipe connector 42 is made of a hard material and cannot be retracted, so the spiral telescopic pipe body 20 can be firmly installed on the second pipe connector 42. The second pipe connector 42 plays a good installation and supporting role, so the spiral telescopic pipe body 20 is not easy to loosen from the second pipe connector 42 along the axis. In order to further facilitate the storage, the second pipe connector 42 is made of a telescopic material, so that the second pipe connector 42 of the second adapter 40 can also be contracted to a certain extent to reduce the occupied space and facilitate the storage. In the present embodiment, the size of the second pipe connector 42 is slightly smaller than that of the spiral telescopic pipe body 20. When assembling, the outer wall of the second pipe connector 42 is abutted with the inner wall of the spiral telescopic pipe body 20. It can be expected that in other embodiments, the size of the second pipe connector 42 is slightly larger than that of the spiral telescopic pipe body 20. When assembling, the inner wall of the second pipe connector 42 is butted with the outer wall of the spiral telescopic pipe body 20.

Further, the second adapter seat 41 is provided with at least two second clamping grooves 43, and the second clamping groove 43 is located on an outer wall of the second adapter seat 41. The second clamping groove 43 serves the same purpose as the first clamping groove 33 above, which will not be repeated herein.

Further, the second adapter seat 41 is provided with at least one second leak-proof gasket 44, and the second leak-proof gasket 44 is arranged around the outer wall of the second adapter seat 41. The second leak-proof gasket 44 serves the same purpose as the first second leak-proof gasket 34 above, which will not be repeated herein. In the present embodiment, two second leak-proof gaskets 44 are provided, so that a double sealing may be formed, delivering a better leak-proof sealing effect.

Further, the second adapter seat 41 includes a second rectangular section 411 and a second horn section 412 which are interconnected, and the second horn section 412 is connected with the second pipe connector 42. The second rectangular section 411 and the second horn section 412 serve the same purpose as the first rectangular section 311 and the first horn section 312, which will not be repeated herein. In other embodiments, the second adapter seat 41 may also be other hollow shapes, such as circular tubular shape, pentagonal tubular shape, etc., which is not limited herein.

The technical features of the above embodiments can be arbitrarily combined. To make the description concise, not all possible combinations of the technical features of the above embodiments have been described. However, as long as there is no contradiction in the combination of these technical features, it should be considered as the scope of the description.

The above embodiments only described several embodiments of the present invention, and the description is relatively specific and detailed, but it cannot be understood as a limitation to the scope of the present invention patent. It should be noted that for a person of ordinary skill in the art, a number of variations and improvements can be made without departing from the conception of the present invention, and these variations and improvements fall within the scope of protection of the present invention. Therefore, the scope of protection of the present invention patent shall be subject to the appended claims.

The invention claimed is:

1. A telescopic drainpipe assembly, comprising:
a spiral telescopic pipe body, and
a first adapter connected to one end of the spiral telescopic pipe body; wherein
the first adapter comprises a hollow first adapter seat and a first pipe connector connected to the first adapter seat, the first pipe connector is spirally provided, and the first pipe connector is in threaded connection to the spiral telescopic pipe body;
the first adapter seat is provided with two first leak-proof gaskets, and the two first leak-proof gaskets are arranged around an outer wall of the first adapter seat; two locking adapters are provided between the two first leak-proof gaskets and symmetrically arranged on the outer wall of the first adapter seat.

2. The telescopic drainpipe assembly according to claim 1, wherein the first adapter seat is provided with at least two first clamping grooves, and the at least two first clamping grooves are located on an outer wall of the first adapter seat.

3. The telescopic drainpipe assembly according to claim 1, wherein the first adapter seat is provided with at least one first leak-proof gasket, and the at least one first leak-proof gasket is arranged around an outer wall of the first adapter seat.

4. The telescopic drainpipe assembly according to claim 3, wherein the at least one first leak-proof gasket is arranged at one end of the first adapter seat away from the first pipe connector.

5. The telescopic drainpipe assembly according to claim 1, wherein the first adapter seat is provided with a locking adapter, and the locking adapter is located on an outer wall of the first adapter seat.

6. The telescopic drainpipe assembly according to claim 1, wherein the first adapter seat comprises a first rectangular section and a first horn section which are interconnected, and the first horn section is connected with the first pipe connector.

7. The telescopic drainpipe assembly according to claim 1, wherein the first pipe connector is made of a material that allows the first pipe connector to stretch and contract along an axis of the first pipe connector.

8. The telescopic drainpipe assembly according to claim 1, further comprising a second adapter connected to an other end of the spiral telescopic pipe body;

wherein the second adapter comprises a hollow second adapter seat and a second pipe connector connected to the second adapter seat, the second pipe connector is spirally provided, and the second pipe connector is in threaded connection to the spiral telescopic pipe body.

9. The telescopic drainpipe assembly according to claim 8, wherein the second adapter seat is provided with at least two second clamping grooves, and the at least two second clamping grooves are located on an outer wall of the second adapter seat.

10. The telescopic drainpipe assembly according to claim 9, wherein the second adapter seat is provided with at least one second leak-proof gasket, and the at least one second leak-proof gasket is arranged around the outer wall of the second adapter seat.

11. The telescopic drainpipe assembly according to claim 8, wherein the second adapter seat comprises a second rectangular section and a second horn section which are interconnected, and the second horn section is connected with the second pipe connector.

12. The telescopic drainpipe assembly according to claim 8, wherein the second pipe connector is made of a material that allows the second pipe connector to stretch and contract along an axis of the second pipe connector.

* * * * *